Dec. 27, 1938.    R. E. DUNBAR    2,141,268

COMMUTATOR AND METHOD OF MAKING SAME

Filed April 28, 1936

Inventor:
Ralph E. Dunbar,
by Harry E. Dunham
His Attorney.

Patented Dec. 27, 1938

2,141,268

UNITED STATES PATENT OFFICE 2,141,268

COMMUTATOR AND METHOD OF MAKING SAME

Ralph E. Dunbar, East Cleveland, Ohio, assignor to Electric Vacuum Cleaner Company, Inc., Cleveland, Ohio, a corporation of New York Application April 28, 1936, Serial No. 76,781

12 Claims. (Cl. 29—155.54)

The present invention relates to commutators for dynamo-electric machines.

It has been customary to insulate the copper segments of commutators by strips of mica arranged between the segments. Due to its mechanical strength and insulating properties mica is a very satisfactory material. However, mica is much harder than the copper segments, so that it has been necessary to under-cut the mica by sawing slots between the adjacent segments of the commutator. The slotting removes the mica adjacent the brush engaging surface and thereby permits the use of less abrasive soft carbon brushes. The disadvantage of under-cutting the mica is that unless great pains are taken, some mica may be left in the slots, and as soon as this mica is reached, the brushes are worn away very rapidly. Also, the mica does not wear away as fast as the copper, and causes high spots on the commutator, which in turn causes the brushes to jump, resulting in excessive sparking which burns the commutator. In view of these difficulties, the harder India mica has not been used between the commutator segments in spite of its low cost, but instead the more expensive and softer amber mica has been used.

The object of my invention is to provide an improved construction and arrangement in commutators which will overcome some of the disadvantages of mica insulation, and for a consideration of what I believe novel and my invention attention is directed to the accompanying description and the claims appended thereto.

Figure 1:
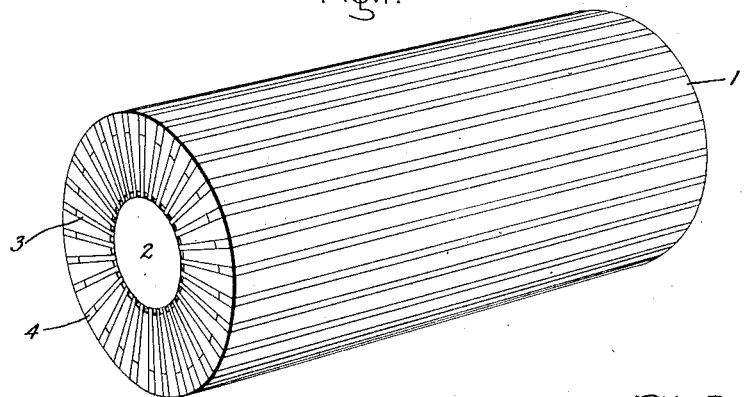
Figure 2:
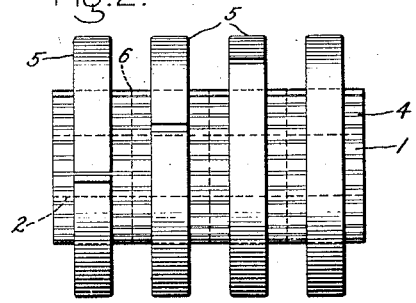
Figure 3:
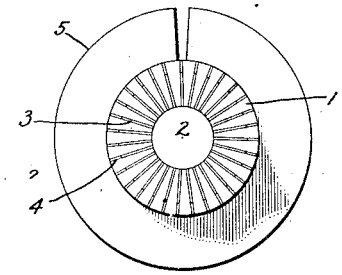
Figure 4:
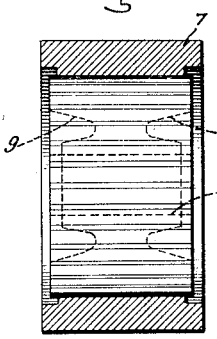
Figure 5:
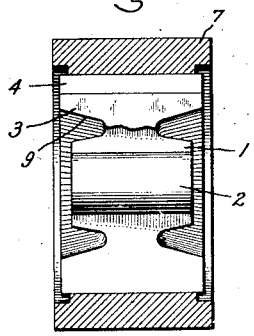
Figure 6:
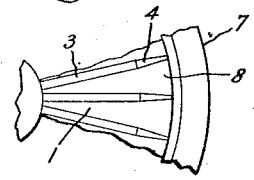
Figure 7:
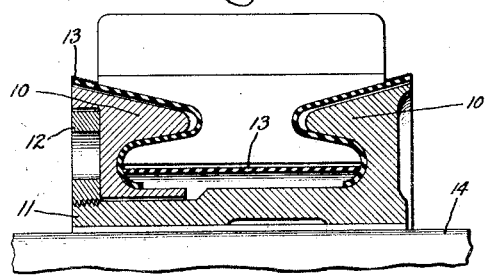

In the accompanying drawing, Fig. 1 is a perspective view of commutator segments stacked with insulation between adjacent segments; Fig. 2 is a view showing clamping rings pressed over the stacked segments; Fig. 3 is an end elevation of the segments held in a clamping ring; Fig. 4 is a sectional elevation of the segments pressed into a machining ring; Fig. 5 is a view similar to Fig. 4 after completing the machining; Fig. 6 is a fragmentary end view showing the deformation of the segments caused by pressing the segments into the machining ring; and Fig. 7 is a fragmentary sectional view of the completed commutator.

In the manufacture of the commutator the copper segments 1 are stacked in the form of an annulus around a wooden core 2. Between adjacent segments are arranged a strip 3 of mica and a strip 4 of a tough, pliable fibrous dielectric material which is softer and less abrasive than copper, such as paper or a material made from paper or paper pulp. After completing the stacking, a number of clamping rings 5 are pressed over the stacked segments, holding the segments together. The clamping rings cause the inner edges of the mica strips and copper segments to be pressed tightly against the wooden core. The segments are then cut to the required length along the dotted lines 6 in Fig. 2. The segments held within each clamping ring are then pressed into a machining ring 7. The machining ring is of slightly less diameter than the clamping ring, so that as the segments are pressed into the machining ring the outer or brush engaging surface of the segments is deformed, as shown at 8 in Fig. 6. This deformation decreases the spacing between the segments adjacent the outer surface, and causes the insulation to be tightly gripped between the segments. This gripping action is made possible by the fact that the fibrous insulation 4 is softer than the copper. The commutator is then machined, as indicated by the dotted lines in Fig. 4, to provide notches 9 in the ends of the segments for receiving clamping members 10. One of the clamping members is made integral with a sleeve 11 on which is threaded a nut 12 for effecting the clamping action. Suitable insulation 13 is arranged between the segments and the clamping members 10 and the sleeve 11. The sleeve 11 may serve as a means for attaching the comutator to a shaft 14.

In this construction advantage is taken of the mechanical strength of the mica for holding the segments rigidly in place, but the arrangement is such that the mica does not come in contact with the brushes. It is therefore possible to use the harder and cheaper forms of mica. The fibrous insulation 4, which does come in contact with the brushes, is softer and less abrasive than the copper, and therefore wears down at the same rate or slightly faster than the copper. This permits the use of very soft brushes, which decreases the wear on the segments. The mechanical strength of the fibrous insulation 4 is insufficient for use throughout the entire length of the segments but it has sufficient mechanical strength for this use. Due to the deformation of the fibrous insulation, as shown in Fig. 6, the fibrous insulation is securely held within the segments against the action of centrifugal force.

With this commutator, the brushes have about 50% longer life than can be obtained from the same grade brushes when used on commutators having undercut mica insulation. This increase in life is probably due to the fact that some particles of mica remain in the slots after the under-cutting operation. These particles of mica, being harder than the brushes, increase the brush wear. The brush life obtained with the present commutator is also more uniform. A further advantage of this commutator is a decrease in cost which results from the elimination of the under-cutting operation and the use of the harder and cheaper forms of mica.

What I claim as new and desire to secure by Letters Patent of the United States, is:

1. A commutator comprising segments insulated by preformed strips of insulation stacked between adjacent segments, and means for clamping the segments together whereby the strips of insulation are clamped therebetween, said insulation being in two portions, the portion adjacent the brush engaging surface of the segments being preformed strips of fibrous material less abrasive than the segments, and the other portion of the insulation being preformed strips of mica.

2. A commutator comprising segments insulated by preformed strips of insulation stacked between the segments, and means for clamping the segments together whereby the strips of insulation are clamped therebetween, the insulation being in two portions, the portion adjacent the brush engaging surface of the segments being preformed strips of fibrous material less abrasive than the segments, and the other portion being preformed strips of mica, said segments being shaped so that the spacing between the segments is less adjacent the brush engaging surface whereby the fibrous material will be deformed.

3. The method of making a commutator, which comprises stacking segments with insulation arranged between adjacent segments, the insulation adjacent the brush engaging surface of the segments comprising a strip of fibrous material less abrasive than the segments, and the remaining insulation comprising a strip of mica, clamping the segments together, and deforming the segments adjacent the brush engaging surface to cause the insulation to be tightly gripped between the segments.

4. The method of making a commutator, which comprises stacking segments with insulation between adjacent segments, the insulation adjacent the brush contacting surface of the segments being of fibrous material softer than the segments, clamping the segments together, and deforming the segments adjacent the brush engaging surface to cause the insulation to be tightly gripped between the segments.

5. The method of making a commutator, which comprises stacking segments in the form of an annulus with insulation between adjacent segments, the insulation adjacent the periphery of the annulus being softer than the segments, and pressing the stacked segments into a ring of smaller diameter than the annulus whereby the segments will be deformed adjacent the periphery of the annulus to cause the insulation to be tightly gripped between the segments.

6. A commutator, comprising segments insulated by preformed strips of insulation stacked between adjacent segments, and means for clamping the segments together whereby the strips of insulation are clamped therebetween, the insulation adjacent the brush engaging surface of the segments being preformed strips of fibrous material less abrasive than the segments, and said segments being shaped so that the spacing between the segments is less adjacent the brush engaging surface whereby the fibrous material will be deformed.

7. A commutator comprising segments insulated by preformed strips of insulation stacked between adjacent segments, and means for clamping the segments together whereby the strips of insulation are clamped therebetween, the insulation adjacent the brush engaging surface of the segments being preformed strips of tough, pliable material less abrasive than the segments, and said segments being shaped so that the spacing between the segments is less adjacent the brush engaging surface whereby the insulation will be deformed.

8. A commutator comprising segments insulated by preformed strips of insulation stacked between adjacent segments, and means for clamping the segments together whereby the strips of insulation are clamped therebetween, said insulation being in two portions, the portion adjacent the brush engaging surface of the segments being preformed strips of tough, pliable material less abrasive than the segments, and the other portion of the insulation being preformed strips of material having the properties of mica.

9. A commutator comprising segments insulated by strips of insulation stacked between adjacent segments, and means for clamping the segments together whereby the strips of insulation are clamped therebetween, the insulation adjacent the brush engaging surface of the segments being of tough, pliable material less abrasive than the segments, said commutator being made by stacking the segments and insulation, clamping the segments together, and applying pressure to the brush engaging surface of the segments sufficient to cause lateral spreading of the segments adjacent the brush engaging surface whereby the insulation is tightly gripped between the segments.

10. The method of making a commutator which comprises stacking segments in the form of an annulus with insulation between adjacent segments, the insulation adjacent the brush engaging surface of the segments being of tough, pliable material softer than the segments, clamping the segments together, and applying pressure to the brush engaging surface of the segments sufficient to cause lateral spreading of the segments adjacent the brush engaging surface whereby the insulation will be tightly gripped between the segments.

11. The method of making a commutator which comprises stacking segments with insulation arranged between adjacent segments, the insulation adjacent the brush engaging surface of the segments comprising a strip of tough, pliable material softer than the segments, and the remaining insulation comprising a strip of material having the properties of mica, clamping the segments together, and applying pressure to the brush engaging surface of the segments sufficient to cause lateral spreading of the segments adjacent the brush engaging surface whereby the insulation will be tightly gripped between the segments.

12. A commutator comprising segments insulated by preformed strips of insulation stacked between adjacent segments, and means for clamping the segments together whereby the strips of insulation are clamped therebetween, said insulation being in two portions, the portion adjacent the brush-engaging surface of the segments being preformed strips of paper and the other portion of the insulation being preformed strips of material having the properties of mica.

RALPH E. DUNBAR.